United States Patent
Wang

(10) Patent No.: US 6,800,165 B2
(45) Date of Patent: Oct. 5, 2004

(54) METHOD FOR PRODUCING PLASTIC PRODUCTS WITH REINFORCED HEAT SEALED JOINTS

(75) Inventor: Cheng-Chung Wang, Taipei (TW)

(73) Assignee: Team Worldwide Corp., Taipei (TW)

( * ) Notice: Subject to any disclaimer, the term of this patent is extended or adjusted under 35 U.S.C. 154(b) by 226 days.

(21) Appl. No.: 09/999,341

(22) Filed: Nov. 29, 2001

(65) Prior Publication Data

US 2002/0036063 A1 Mar. 28, 2002

Related U.S. Application Data

(63) Continuation-in-part of application No. 09/432,446, filed on Nov. 2, 1999, now abandoned.

(51) Int. Cl.$^7$ ................................................ B32B 31/00
(52) U.S. Cl. ..................... 156/209; 156/275.1; 156/290; 156/292; 156/308.4; 264/167; 264/284; 5/706; 5/655.3
(58) Field of Search ................................. 156/196, 200, 156/201, 204, 209, 219, 275.1, 290, 291, 292, 308.4; 53/477, 553; 5/706, 707, 654, 655.3; 206/484; 428/156, 157, 166; 264/165, 167, 175, 280, 284

(56) References Cited

U.S. PATENT DOCUMENTS

| | | | |
|---|---|---|---|
| 3,959,052 A | | 5/1976 | Stanek |
| 4,343,667 A | | 8/1982 | Hollis |
| 4,868,022 A | * | 9/1989 | Marx et al. ................. 428/35.1 |
| 5,611,879 A | * | 3/1997 | Morman ..................... 156/201 |
| 5,804,020 A | | 9/1998 | Akao et al. |
| 6,178,723 B1 | * | 1/2001 | Mossbeck .................... 53/450 |

* cited by examiner

*Primary Examiner*—Jeff H. Aftergut
*Assistant Examiner*—John T. Haran
(74) *Attorney, Agent, or Firm*—Merchant & Gould P.C.

(57) ABSTRACT

A plastic product is fabricated from plastic sheets by heat sealing the plastic sheets to form an enclosure member. In order to strengthen the heat-sealed joints of the plastic sheets, the plastic sheets are thickened at portions where the heat-sealed joints are to be formed. Preferably, the heat-sealed joints are formed in such a manner that the cross-section of the heat-sealed joints is smaller than that of the thickened portions of the plastic sheet, thereby preventing effectively the non-thickened portions of the plastic sheets from being affected adversely by the heat sealing process.

6 Claims, 6 Drawing Sheets

METHOD FOR PRODUCING PLASTIC PRODUCTS WITH REINFORCED HEAT SEALED JOINTS

CROSS REFERENCE TO RELATED APPLICATION

This is a Continuation-In-Part of U.S. patent application Ser. No. 09/432,446 which was filed on Nov. 2, 1999 and which is abandoned as of the filing date of this application.

BACKGROUND OF THE INVENTION

1. Field of the Invention

The invention relates to a method for producing plastic products, more particularly to a method for producing plastic products which comprises improvements with respect to the heat-sealing of the plastic products.

2. Description of the Related Art

Conventionally, plastic products, such as inflatable cushions, air beds, floats, etc. are fabricated by joining a plurality of plastic sheet parts along the peripheries of the same. As shown in FIG. 1, the joined portions 10, 20 of the sheet parts 1, 2 of a plastic article are heated and pressed during a heat-sealing process to form connecting seams of a plastic product. Since the thickness of the heat-sealed seams is decreased, the structural strength at the seams of the plastic product is relatively weak.

In addition, to maintain a plastic product, such as an infaltable cushion pad 3, in a generally cubic configuration, connection members 31 are provided within the interior of the cushion pad 3, as shown in FIG. 2. The two ends of the connection members 31 are connected to two opposed face sheets 30 of the cushion pad 3 during a heat-sealing process. Since the thickness of the face sheets 30 at the joints of the connection members 31 and the face sheets 30 are decreased due to the heat-sealing process, the joints on the cushion pad 3 are liable to be damaged when in use.

In order to address the aforesaid problems encountered with the heat-sealed joints of the conventional inflatable articles, a solution therefor is to use thick face sheets in fabricating products. However, this increases the costs of manufacturing such inflatable products.

U.S. Pat. No. 3,959,052 discloses a method for preparing a wraparound closure for cables, pipes, splices, and junctions to effect repair, insulation, or waterproofing. The method includes overlapping and sealing two thick edges of a sheet to form a tubular member around an item to be wrapped. The sheet is made of a heat shrinkable plastic material. The two ends of the sheet are clamped and the material between the clamped edges is stretched and cooled below the crystalline melting point of the material while it is still in expanded condition. The resulting sheet thus has a stretched central section which is heat shrinkable or heat recoverable, and two thick ends which are not stretched. These thick ends are not formed intentionally for reinforcing the sealed joint of the two ends of the sheet. Rather, they are formed inherently when they are clamped during the stretching process of the sheet. In addition, the method in this patent provides only two thick ends where the sheet is clamped. This patent does not contemplate reinforcing the heat-sealed joints of plastic products by thickening parts of a sheet and suggests nothing relevant to the thickening of a sheet in regions between two ends of the sheet.

SUMMARY OF THE INVENTION

An object of the present invention is to provide a method for producing plastic products, which can provide reinforced heat-sealed joints for the plastic products.

Another object of the invention is to provide a method for producing plastic products, which can prevent the plastic products from being weakened due to a heat-sealing process.

According to one aspect of the invention, a method for producing a plastic product, comprises: forming upper and lower face sheets with marginal parts, and providing the upper and lower face sheets with a plurality of spaced apart thick connection parts in both upper and lower face sheets within regions confined by the marginal parts, the thick connection parts being thicker than remaining parts of the upper and lower face sheets; and providing tension members between the upper and lower face sheets, and respectively heat-sealing two ends of the tension members to the thick connection parts of the upper and lower face sheets to form inner heat-sealed joints.

In another aspect of the present invention, a method for producing a plastic product comprises: forming upper and lower face sheets having thick marginal parts; and heat-sealing the thick marginal parts of the upper and lower face sheets to form a marginal heat-sealed joint by applying heat and pressure to an area, within each of the thick marginal parts, which is smaller than the cross-section of the corresponding one of the thick marginal parts.

In a further aspect of the invention, a method for producing a plastic product comprises: providing a plastic sheet having marginal ends; thickening portions of the plastic sheet within a region confined by the marginal ends to form thick connection parts at intervals; thickening the marginal ends to form thick marginal parts; and forming the plastic sheet into the plastic product by heat sealing the thick marginal parts to one another and by heat sealing the thick connection parts to one another.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
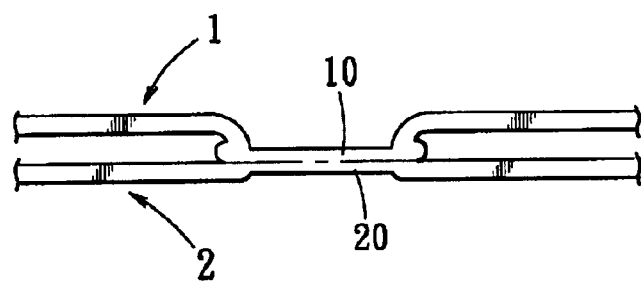
FIG. 1 shows a heat-sealed joint of two plastic sheets formed via a conventional method.
Figure 2:
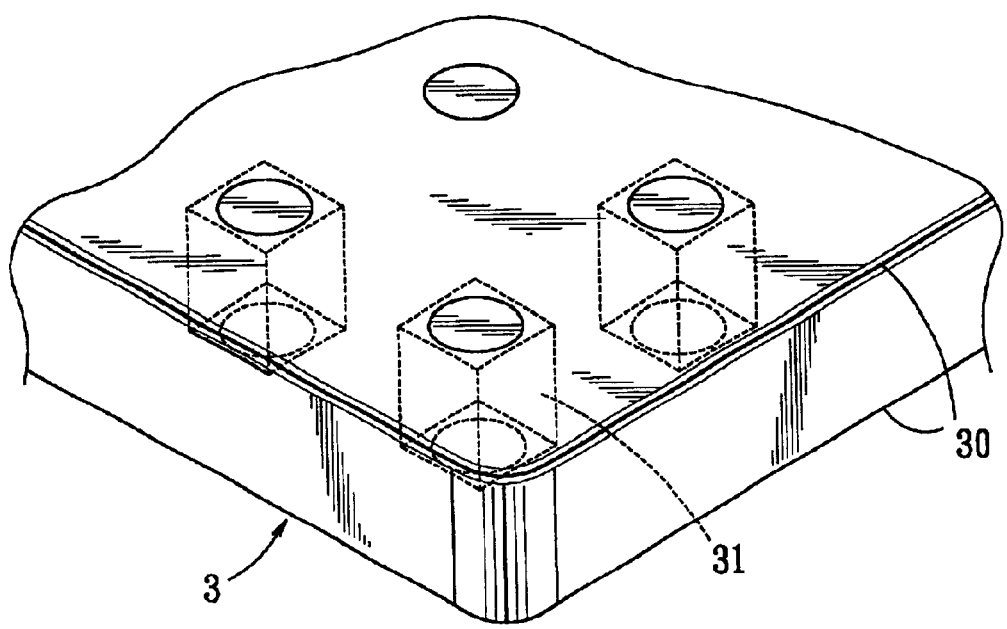
FIG. 2 shows heat-sealed joints formed in an inflatable cushion pad by heat sealing connection members to face sheets according to a conventional method.
Figure 3:
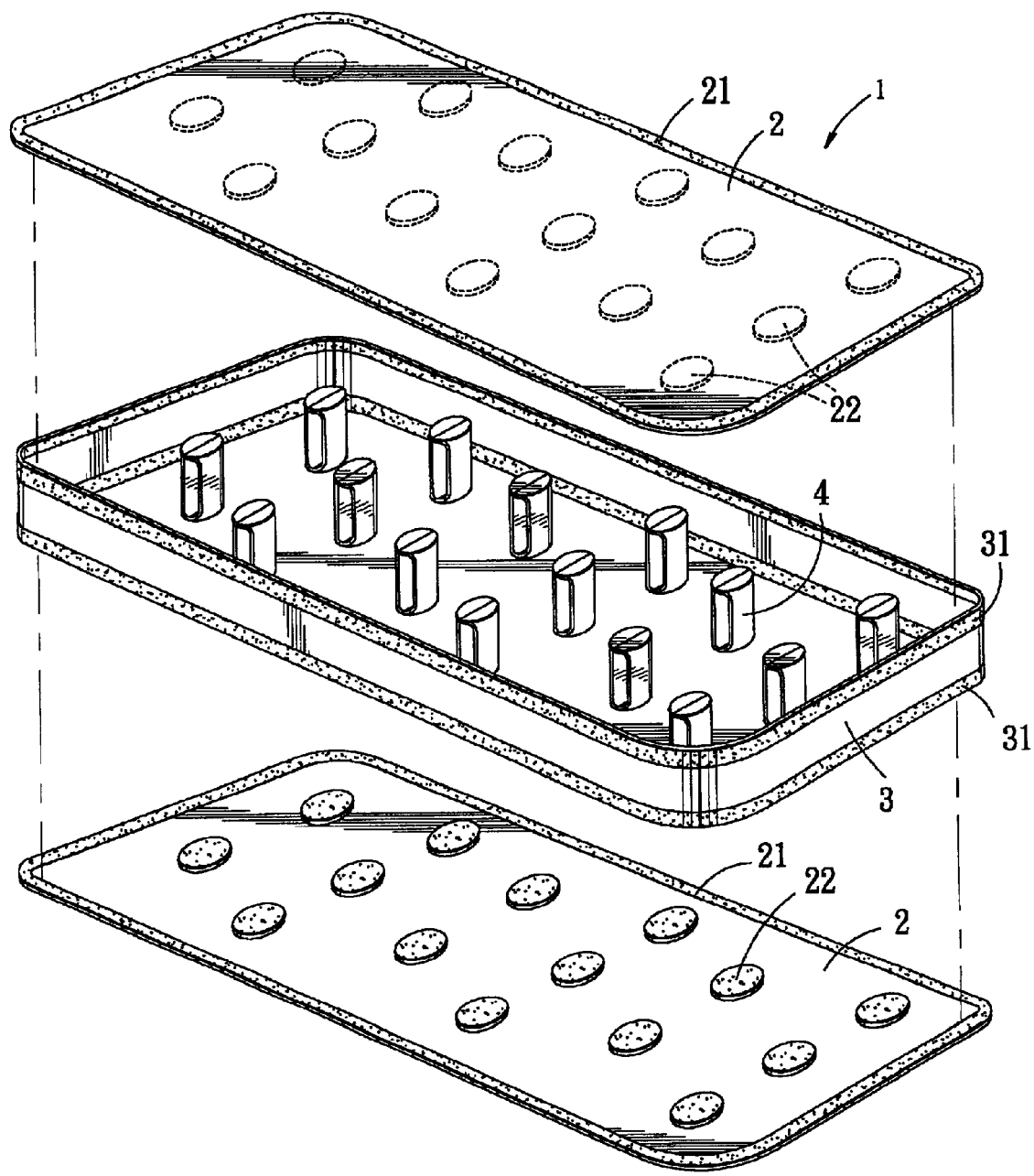
FIG. 3 is an exploded view of an air mattress produced via a preferred embodiment of the method according to the present invention.
Figure 4:
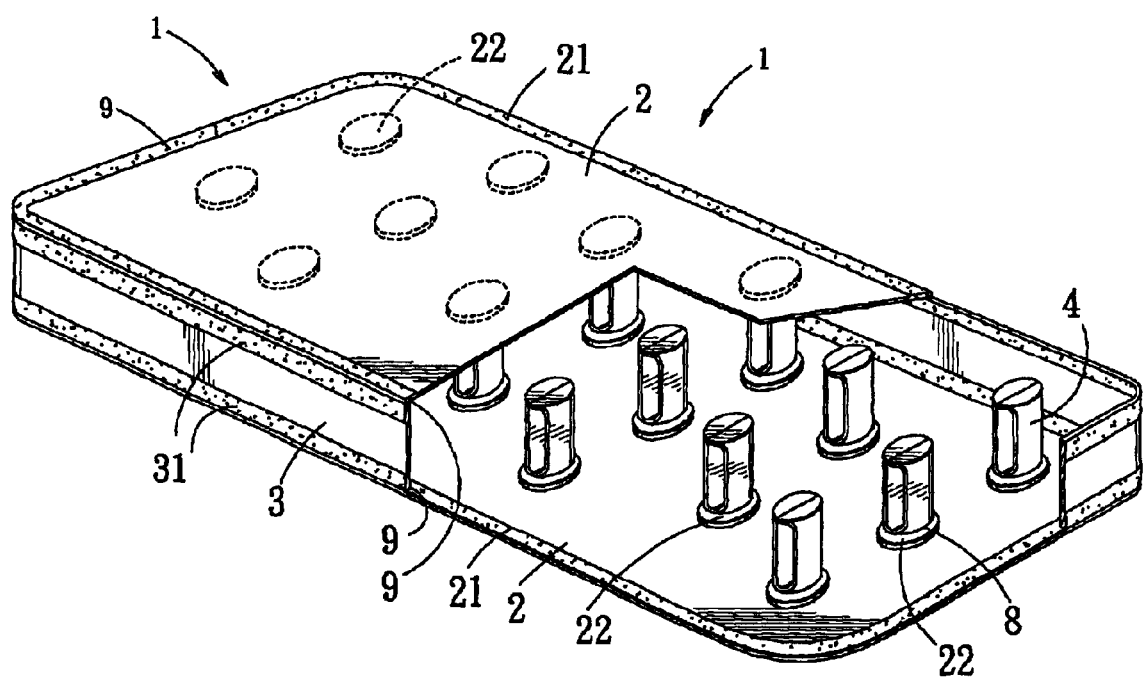
FIG. 4 is a perspective view of the air mattress of FIG. 3 with a portion thereof being removed.

Referring to FIGS. 3 and 4, an air mattress 1 produced by a preferred embodiment of the method according to the present invention is shown. The air mattress 1 is fabricated from upper and lower plastic face sheets 2, a lateral plastic sheet 3 and a plurality of plastic tension members 4. Each of the upper and lower face sheets 2 has four sides and includes thick marginal parts 21 extending at the four sides thereof, and a plurality of spaced apart thick connection parts 22 formed within the region confined by the thick marginal parts 21.

The lateral sheet 3 is elongated and looped, and is formed with upper and lower thick marginal parts 31 at two opposite sides of the lateral sheet 3. The tension members 4 are disposed at intervals between the upper and lower face sheets 2 and are aligned with the corresponding thick connection parts 22 of the upper and lower face sheets 2.

Figure 5:
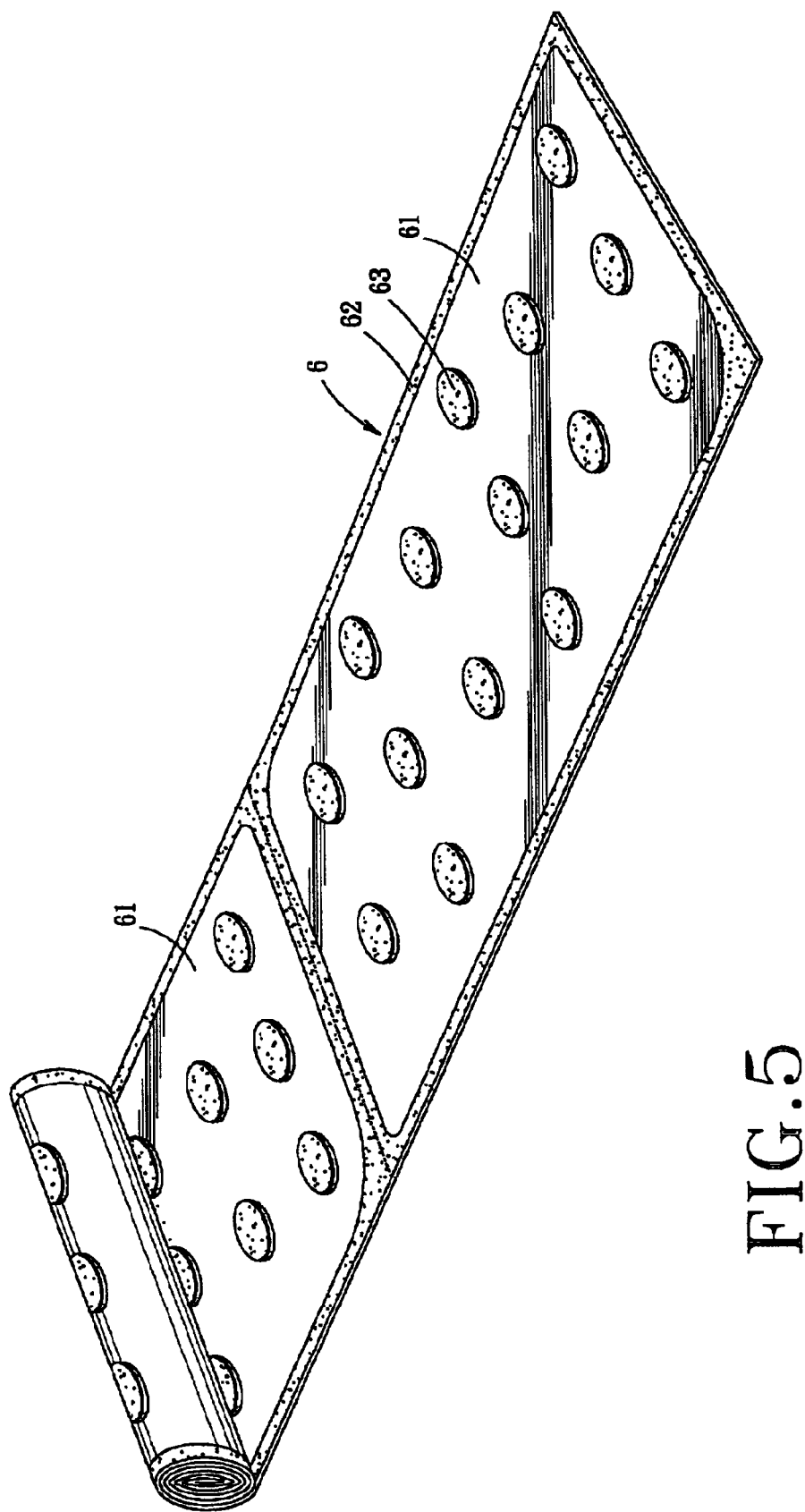
FIG. 5 is a perspective view of a roll of sheet material for making the air mattress.

As shown in FIG. 5, the upper and lower face sheets 2 are obtained from a roll of sheet material 6. The sheet material 6 is embossed to define a plurality of sections 61 each corresponding in dimension to the upper and lower face sheets and to form raised patterns 62, 63 corresponding to the thick marginal parts 21 and the thick connection parts 22, respectively. The sheet material 6 is cut to separate the sections 61 that provide a plurality of upper and lower face sheets 2.

Figure 6:
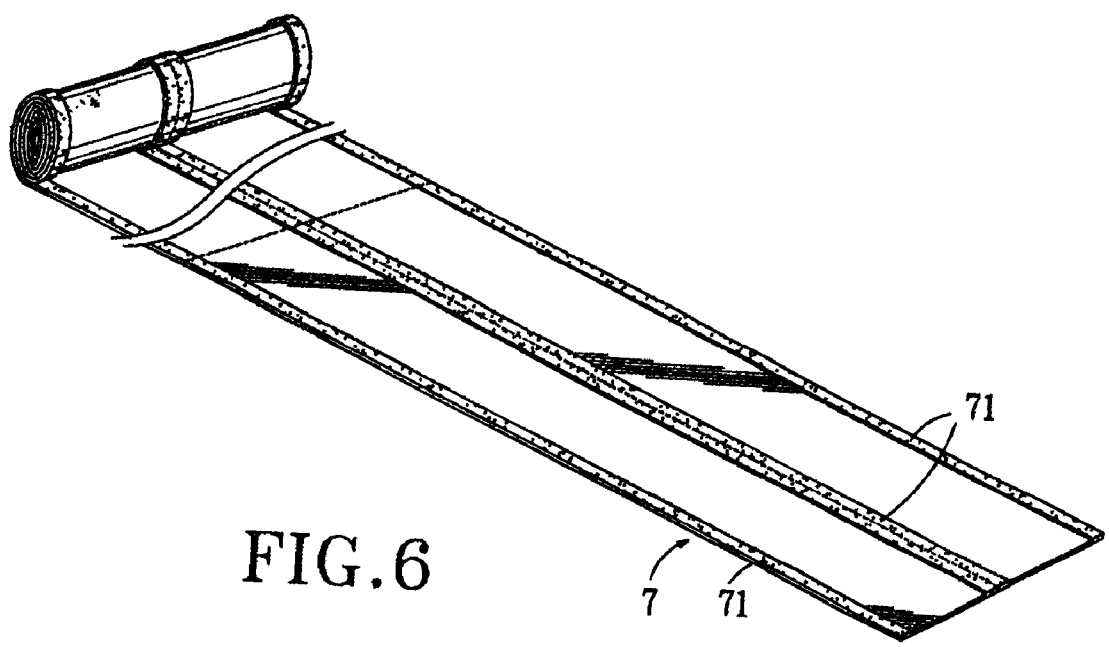
FIG. 6 is a perspective view of another roll of sheet material for making the air mattress.

As shown in FIG. 6, the lateral sheet 3 is obtained from a roll of sheet material 7 which is embossed to form raised patterns 71 that correspond to the thick marginal parts 31 of the lateral sheet 3. The sheet material 7 is cut longitudinally and transversely to result in a plurality of lateral sheets 3.

In order to make the air mattress 1, the tension members 4 are first placed between the upper and lower face sheets 2 and the two opposite ends of the tension members 4 are connected to the respective thick connection parts 22 via a heat-sealing process to form inner heat-sealed joints 8, as shown in FIG. 4. Afterwards, the lateral sheet 3 is connected to the upper and lower face sheets 2 by heat sealing the upper thick marginal parts 31 of the lateral sheet 3 to the thick marginal parts 21 of the upper face sheet 2 and by heat sealing the lower thick marginal parts 31 of the lateral sheet 3 to the thick marginal parts 21 of the lower face sheet 2. As a result, marginal heat-sealed joints 9 are formed at the thick marginal parts 21, 31, and the upper and lower sheets 2 and the lateral sheet 3 are formed into an enclosure member.

Preferably, during the heat sealing process, heat and pressure are applied to an area within each of the thick marginal parts 21, 31 and each of the thick connection parts 22. Said area is smaller than the cross-section of the corresponding one of the thick marginal parts 21, 31 and the thick connection parts 22. Accordingly, the cross-section of the heat-sealed joints 8 is smaller than that of the thick connection parts 22, and the cross-section of the marginal heat-sealed joints 9 is smaller than that of the thick marginal parts 21, 31. To accomplish this, the tension members 4 may be arranged to have a cross-section smaller than that of the thick connection parts 22. Since heat and pressure are applied only to areas confined within the thick marginal parts 21 or 31 and the thick connection parts 22, portions of the upper and lower face sheets 2 and the lateral sheet 3 other than the thick marginal parts 21, 31 and the thick connection parts 22 can be effectively prevented from being affected adversely by the applied heat and pressure.

Due to the provision of thick marginal parts 21, 31 and thick connection parts 22 in the upper and lower face sheets 2, the air mattress 1 is strengthened at the heat-sealed joints 8 and 9 and is more durable than those produced by the conventional method.

Figure 7:
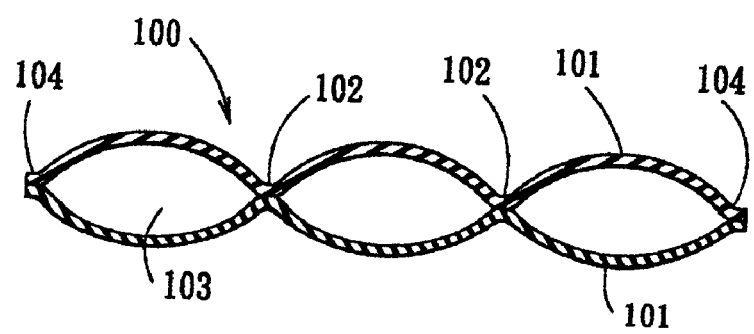
FIG. 7 is a sectional view of an inflatable product produced by another preferred embodiment of the method according to the present invention.
Figure 8:
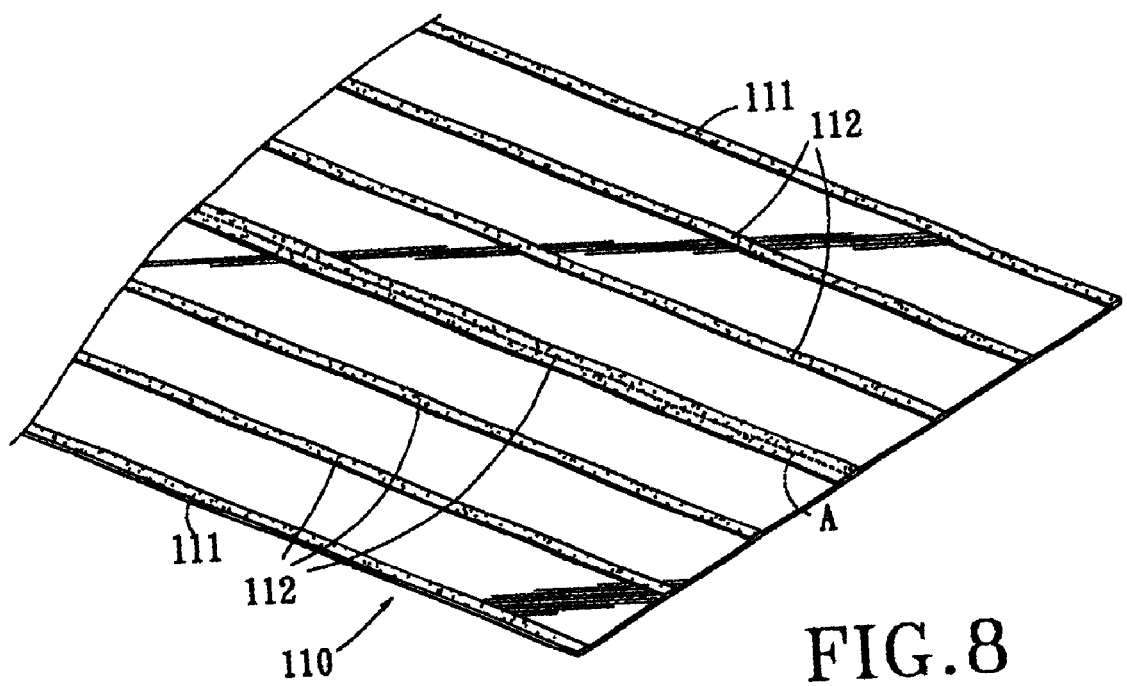
FIG. 8 is a perspective view of a sheet material for making the inflatable product.

Referring to FIGS. 7 and 8, an inflatable product 100 fabricated by another preferred embodiment of the method according to the present invention is shown. As shown in FIG. 7, the inflatable product 100 includes upper and lower sheet layers 101, a plurality of heat-sealed joints 102 and 104, and a plurality of air compartments 103 each defined between adjacent joints 102, 104.

Figure 9:
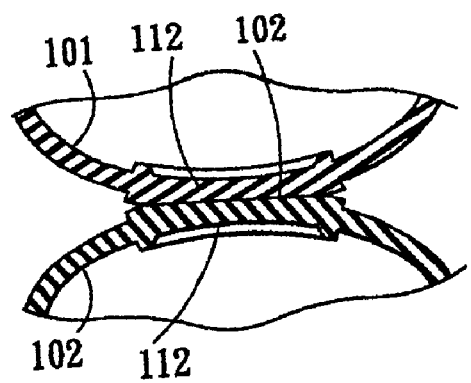
FIG. 9 is an enlarged view of an encircled portion of FIG. 7.

The inflatable product 100 may be fabricated from a sheet material 110 which has a plurality of thick marginal parts 111 and thick connection parts 112 formed in a region confined by the thick marginal parts 111. During fabrication, the sheet material 110 is folded along line (A) and is heat-sealed along the thick marginal parts 111 and the thick connection parts 112 to form the heat-sealed joints 102, 104. Note that the cross-section of the heat-sealed joint 102 is smaller than that of the thick connection parts 112 as shown in FIG. 9. In other words, the areas of the thick connection parts 112 to which the sealing pressure is applied are limited within the perimeters of the thick connection parts 112. As such, the thickness reduction occurs only within the thick connection parts 112 without affecting the remaining non-thickened parts of the sheet material, and the heat-sealed joint 102 possesses a considerable strength as compared to the heat sealed joint of the conventional inflatable article which has no thickened part.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A method for producing a plastic product, comprising:
   providing a plastic sheet having marginal ends;
   forming raised patterns at said marginal ends to form marginal parts and at intervals within a region confined by the marginal ends to form connection parts, wherein the marginal parts and the connection parts are thicker than remaining regions of the plastic sheet; and
   forming said plastic sheet into said plastic product by heat-sealing said marginal parts to one another and by heat-sealing said connection parts to one another.

2. The method according to claim 1, wherein during the heat sealing of said marginal parts and said connection parts, heat and pressure are applied to an area within each of said marginal parts and said connection parts, said area being smaller than a cross-section of said corresponding marginal parts and said corresponding connection parts.

3. The method according to claim 1, wherein said plastic sheet is embossed to form said connection parts and said marginal parts.

4. A method for producing a plastic product, comprising:
   providing a plastic sheet having marginal parts;
   forming raised patterns at intervals within a region confined by the marginal parts to form connection parts, wherein the connection parts are thicker than remaining regions of the plastic sheet; and
   forming said plastic sheet into said plastic product by heat-sealing said marginal parts to one another and by heat-sealing said connection parts to one another.

5. The method according to claim 4, wherein during the heat sealing of said marginal parts and said connection parts, heat and pressure are applied to an area within each of said marginal parts and said connection parts, said area being smaller than a cross-section of said corresponding marginal parts and said corresponding connection parts.

6. The method according to claim 4, wherein said plastic sheet is embossed to form said connection parts.

* * * * *